(12) United States Patent
Dayet et al.

(10) Patent No.: US 11,685,193 B2
(45) Date of Patent: Jun. 27, 2023

(54) TIRE TREAD FOR HGV TRAILER

(71) Applicant: COMPAGNIE GENERALE DES ETABLISSEMENTS MICHELIN, Clermont-Ferrand (FR)

(72) Inventors: Patrick Dayet, Clermont-Ferrand (FR); Benoit Buffetaud, Clermont-Ferrand (FR); Jacques Babaud, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 347 days.

(21) Appl. No.: 16/488,512

(22) PCT Filed: Mar. 2, 2018

(86) PCT No.: PCT/FR2018/050482
§ 371 (c)(1),
(2) Date: Aug. 23, 2019

(87) PCT Pub. No.: WO2018/158546
PCT Pub. Date: Sep. 7, 2018

(65) Prior Publication Data
US 2020/0231008 A1  Jul. 23, 2020

(30) Foreign Application Priority Data
Mar. 3, 2017   (FR) ...................................... 17/70212

(51) Int. Cl.
*B60C 11/12*   (2006.01)
*B60C 11/03*   (2006.01)

(52) U.S. Cl.
CPC ........ *B60C 11/0323* (2013.01); *B60C 11/033* (2013.01); *B60C 11/124* (2013.01);
(Continued)

(58) Field of Classification Search
CPC ............. B60C 11/0323; B60C 11/1236; B60C 11/1281; B60C 11/1259; B60C 11/033;
(Continued)

(56) References Cited

U.S. PATENT DOCUMENTS 4,905,748 A   3/1990  Kukimoto et al.
5,622,575 A   4/1997  Meyer-Adlung et al.
(Continued)

FOREIGN PATENT DOCUMENTS

FR   2 940 185   6/2010
FR   2 972 962   9/2012
(Continued)

*Primary Examiner* — Steven D Maki
(74) *Attorney, Agent, or Firm* — Cozen O'Connor

(57) ABSTRACT

Tire tread (1) is divided into central part (20) and edge parts (30), central part (20) having width Lc between 40% and 90% of total width W of the tread. Edge parts (30) do not have any transverse cuts. Central part (20) has a tread pattern with circumferentially oriented sipe (21) and transversely oriented sipes (22, 22', 22") distributed around the periphery of the tread, such sipes having a depth at least equal to 60% of thickness E of material to be worn away and being interconnected to form a network. Such sipes are continued by hidden channels (210, 220). Central part (20) is delimited axially by transverse sipes (22', 22"), each of which ends in end channel (221', 221") that opens onto tread surface (10) and extends into the thickness of the tread, and each end channel (221', 221") is connected to the network formed by the hidden channels.

14 Claims, 2 Drawing Sheets

(52) U.S. Cl.
 CPC ...... *B60C 11/1204* (2013.01); *B60C 11/1236* (2013.01); *B60C 11/1259* (2013.01); *B60C 11/1281* (2013.01); *B60C 2011/1209* (2013.01); *B60C 2011/1227* (2013.01); *B60C 2011/1245* (2013.01); *B60C 2200/06* (2013.01)

(58) Field of Classification Search
 CPC ........... B60C 11/124; B60C 2011/1209; B60C 2011/1245
 See application file for complete search history.

(56) References Cited

U.S. PATENT DOCUMENTS

| | | | | |
|---|---|---|---|---|
| 5,896,905 | A * | 4/1999 | Lurois | B60C 11/12 |
| | | | | 152/209.23 |
| 9,022,083 | B2 | 5/2015 | Voss et al. | |
| 2011/0048603 | A1* | 3/2011 | Kleffmann | B60C 11/033 |
| | | | | 152/209.21 |
| 2011/0168311 | A1* | 7/2011 | Voss | B60C 11/1281 |
| | | | | 152/209.18 |
| 2011/0259487 | A1* | 10/2011 | Montbel | B29D 30/0606 |
| | | | | 152/151 |
| 2017/0001478 | A1* | 1/2017 | Rolland | B60C 11/1236 |
| 2017/0225517 | A1* | 8/2017 | Lawson | B60C 11/12 |

FOREIGN PATENT DOCUMENTS

| | | |
|---|---|---|
| FR | 2 995 253 | 3/2014 |
| WO | WO 2015/114129 | 8/2015 |
| WO | WO-2015/114129 A1 * | 8/2015 |
| WO | WO-2016/054278 A1 * | 4/2016 |

* cited by examiner

TIRE TREAD FOR HGV TRAILER

RELATED APPLICATIONS

This is a U.S. National Phase Application under 35 USC 371 of International Application PCT/FR2018/050482 filed on Mar. 2, 2018.

This application claims the priority of French application no. 17/70212 filed Mar. 3, 2017, the entire content of which is hereby incorporated by reference.

FIELD OF THE INVENTION

The present invention relates to tires for heavy-duty vehicles and more particularly tires intended to be fitted to the load-bearing axles of trailer-type vehicles having two or three axles. More specifically, it also relates to the tread pattern of the tread of such tires for improving the wearing of this type of tire.

BACKGROUND OF THE INVENTION

A tire for a heavy-duty vehicle comprises beads intended to be in contact with a mounting rim, these beads being continued radially towards the outside by sidewalls that are themselves connected on either side to a crown part, the latter being covered by a tread, the function of which is to provide contact between the tire and the roadway when the tire is running.

Such tires comprise a carcass reinforcement anchored in the beads, this reinforcement extending through the sidewalls as far as the crown of the tire. This carcass reinforcement, which is formed by one or more reinforced layers, is surmounted radially towards the outside in the crown part of the tire by a crown reinforcement, itself made up of a plurality of reinforced layers.

The tread of a tire has a suitable thickness and is also provided with a tread pattern for a given use. This tread pattern is formed by raised elements that are delimited by grooves, sipes and generally by cuts.

Definitions

A radial direction on a tire denotes a direction that is perpendicular to the axis of rotation of the tire.

An axial direction or transverse direction denotes a direction that is parallel to the axis of rotation of the tire.

A circumferential direction denotes a direction that is tangential to any circle centred on the axis of rotation of the tire.

A cut denotes either a groove or a sipe formed in a tread.

A groove denotes the space formed in a tread between walls of material to a depth at most equal to the thickness of the tread, these walls of material not coming into contact with one another under the normal running conditions of the tire.

A sipe denotes the space formed in a tread between walls of material to a depth at most equal to the thickness of the tread, said walls being able to come into contact, at least partially, with one another under the normal running conditions of the tire.

A channel denotes a cavity formed in a tread, this channel having a cross section of maximum width and maximum height. A channel may be connected to at least one other channel in order to form a flow network for fluid circulating inside the tread. Similarly, a channel may be connected to a sipe. A channel may also be formed so as to open onto the tread surface of a tread and to continue into the thickness of this tread.

A raised element denotes a block or a rib. A raised element is delimited by grooves and has a contact face, this face being intended to come into contact with the roadway when the tire is running, and lateral faces that intersect the contact face along edge faces. A circumferential rib is a raised element that extends all the way round the tire.

The tread surface of a tread denotes all of the contact faces of all of the raised elements of a tread.

Heavy-duty vehicles include trailers having several non-steered axles, that is to say axles that have only one orientation of the tire/wheel assemblies fitted to these axles. Therefore, these tires cannot be steered in order to effect cornering manoeuvres. For some time, a problem associated with the cornering kinematics has been observed for each of said axles. While one of the axles can tangentially follow a circular path, this cannot be the case for the other axles. This results in more pronounced irregular wear for the tires on these axles than for those on the axle of which the tires follow a circular path. Irregular wear means wear that is not uniform and regular over the entire tread surface of the tread of a tire. This wear can result in said tire being withdrawn from service early. It is as if the tires on the axles that do not follow a circular path were subjected to induced drift, causing slip on the road surface and friction of the treads on the road surface, and consequently more pronounced wear.

This problem is well known and several solutions have already been proposed.

The U.S. Pat. No. 5,622,575 proposes a tread, the tread pattern of which is asymmetric, an internal part intended to be positioned towards the inside of the chassis of the vehicle being provided with circumferential grooves and transversely and obliquely oriented sipes, another, external part intended to be positioned towards the outside of the vehicle not having any grooves and sipes. This latter part comprises a plurality of cavities that are disposed in circumferential lines.

The U.S. Pat. No. 4,905,748 proposes a specific tread pattern combined with different radii of curvature on either side of the mid-plane of the tread, this tread pattern comprising grooves with narrower widths on the outer side compared with the groove situated on the inner side.

Although these solutions provide an improvement in terms of irregular wear, it has been found that, for the tires fitted on axles that do not follow a circular path, the outer part of these tires (that is to say the part axially on the outside of the tread thereof) is subjected to a large amount of slip with respect to the road surface, this resulting in more pronounced wear in this axially outer part.

The document U.S. Pat. No. 9,022,083 combines hidden channels surmounted by sipes that intersect to form a network; radial channels are formed at the intersections of the sipes so as to open onto the tread surface and then continue into the thickness of the tread.

The documents FR 2940185 A1, FR2995253 A1, FR 2972962 A1 likewise describe prior art tires with regard to the present invention.

SUMMARY OF THE INVENTION

An objective of the invention is to improve the wearing performance of a tread of tires fitted to axles that do not tangentially follow a circular path while maintaining a level of grip that is adequate for this tread throughout the use thereof.

To this end, one aspect of the invention is directed to the tread of a tire for a heavy-duty vehicle that is intended to be fitted on a heavy-duty trailer comprises beads intended to be in contact with a rim, these beads being continued radially towards the outside by sidewalls that are themselves connected on either side to a crown part, this crown part being covered radially on the outside by a tread having a length and a thickness E of material to be worn away that determines a wear limit and having a tread surface for coming into contact with a road surface when the tire is running. This tire comprises a carcass reinforcement that is anchored in the beads and extends through the sidewalls and into the crown part, the crown part of the tire comprising a crown reinforcement.

The tread of one embodiment of the invention comprises a central part and edge parts, these edge parts axially delimiting the central part.

This tread is provided in its central part and on either side of its mid-plane with a plurality of sipes, this plurality of sipes comprising at least one circumferential sipe and transverse sipes, the latter transverse sipes comprising a first set of lateral sipes and a second set of lateral sipes, each of these sets of lateral sipes comprising a first end close to the mid-plane of the tread and a second end axially on the outside, the two ends of the lateral sipes axially delimiting the central part of the tread. Each lateral sipe opens at its first end into a circumferential sipe.

Furthermore, all the sipes of the central part of the tread extend in the tread to a depth at least equal to 60% of the thickness E of material to be worn away and are extended into the tread by hidden channels of appropriate dimensions for supplementing the continuous flow network under the tread surface in the new state, these hidden channels being intended to form grooves after a predetermined amount of partial wear.

This tread is such that it is entirely without grooves in its central part, the latter having a width at least equal to 40% and at most 90% of the total width W of the tread. Moreover, the lateral sipes formed in the central part of the tread open at their second end into an end channel that opens onto the tread surface of the tread and continues into the thickness of said tread until it meets a hidden channel at the sipe bottom, and thus creates a continuous fluidic flow network between all the channels, regardless of whether they are lateral or hidden.

Thus, it is possible to best adjust the local stiffnesses and overall stiffness of the tire by varying the width of the central part in order to maintain a large volume of material. The mounting position of the tires provided with such treads on heavy-duty vehicles of the trailer type makes it possible to use this type of tread, which can be referred to as relatively compact. The expressions "relatively compact" should be understood here as meaning that the ratio of the area of the voids to a total tread surface area, the latter including both the area of the material and the area of the voids, is low, and more specifically at most equal to 7%.

The transversely oriented sipes should be considered in the present invention to be parallel to the axial direction of the tire or to make a non-zero mean angle with the axial direction (in this case, they can be referred to as being oblique).

Circumferential cuts (grooves, sipes) extend across the entire width of the tread all around the tire.

All the sipes, regardless of whether they are circumferential or transverse, can have rectilinear or non-rectilinear geometries and have, in the thickness of the tread, non-zero inclinations with respect to the direction perpendicular to the tread surface. These same sipes can have geometries that are appropriate for causing facing walls delimiting them to mechanically interlock.

The thickness of material E to be worn away usually corresponds to the distance between the tread surface of the tread in the new state to the innermost points of the sipes or channels in the tread.

By virtue of this tread pattern, it is possible to maintain very high stiffness in the tread, both at the edges and in the central part thereof, while retaining a good running performance level on a road surface covered in water, the water evacuation channels connected to the tread surface being formed under the tread surface in the new state.

Preferably, the end channels have a cross-sectional area of between the cross-sectional area of a disc with a diameter equal to 15% of the width Lb of each edge and the cross-sectional area of a disc with a diameter equal to 25% of the width of each edge.

Advantageously, the central part has a width at least equal to 60% and even more advantageously equal to 80% of the total width W of the tread.

In one preferred variant of the invention, the edge parts do not have any circumferential cuts, regardless of whether these are grooves or sipes. These edge parts can be considered to be "smooth" or solid parts, the volumetric void ratio thereof being equal to 0%.

This latter variant differs from the prior art mentioned above through the absence, in the new state, of any grooves opening onto the tread surface either in the central part or in the edge parts.

Advantageously, the volumetric void ratio of the central part in the new state is at least equal to 6% and at most equal to 9%; this volumetric void ratio is evaluated on the uninflated tire between the tread surface and a surface that is parallel to the tread surface and passes through the innermost points of the deepest cavity (sipe or hidden channel).

Advantageously, the surface void ratio of the central part is at least equal to 2% and at most equal to 6% in the new state.

The tread pattern proposed makes it possible to have both high mechanical stiffness at the edges of the tread by virtue of the absence of any transverse cuts, while limiting the loss of stiffness in the central part of the tread by virtue of the fact that the sipes close to such an extent that the facing walls thereof are in at least partial contact when the sipe is in the contact patch in which the tire is in contact with the road surface. These sipes make it possible to create edge faces that are useful for achieving a good grip performance. Moreover, the presence of end channels formed at the boundary between the central part and each edge part makes it possible to ensure that water that is present in this zone in wet weather is captured in a manner favourable to good grip and to thermal ventilation of the edge parts of the tire during running manoeuvres.

It is thus possible to obtain, at the same time:
  an improvement in performance in terms of wear and wear regularity, in particular by increasing the quantity of material that comes into contact with the road surface,
  better resistance to lateral stresses exerted on the tire (for example scrubbing stress observed on multi-axle vehicles steering around small-radius circles),
  satisfactory grip on a road surface covered in water for the type of use in question.

Advantageously, the two ends of the first set of lateral sipes are offset circumferentially from the second ends of the sipes of the second set of lateral sipes so that they do not come into contact with the road surface at the same time.

In one variant of the invention, the transverse or oblique sipes are all inclined in the depth of the tread with respect to the radial direction at one and the same mean angle at most equal to 25 degrees and preferably between 0 degrees and 10 degrees. By virtue of this inclination, better closure of the sipes is produced as the latter are in the contact patch in which the tire is in contact with the road surface.

In another variant of the invention, the tread is provided with additional channels that are open onto the tread and are recessed into the thickness of the tread, these additional channels advantageously being able to be located in the equatorial mid-plane. These additional channels have suitable dimensions and are connected to the other hidden channels so as to form a continuous network of channels.

The density of sipes that are open onto the tread surface in the new state is such that, at the surface of the tread, the greatest diameter of a disc that does not intersect any sipes is at most equal to 14 mm.

By virtue of this tread structure, it is possible to reduce the thickness of material between the crown reinforcement and the innermost channels in the tread, this being beneficial in order to reduce the temperature level reached in the materials when the tire is running. The very low surface and volumetric void ratios make it possible to more effectively protect the crown reinforcement from corrosion and thus to reduce the rate of rejection for retreading.

Further features and advantages of the invention will become apparent from the following description with reference to the appended drawings which show, by way of non-limiting examples, embodiments of the subject matter of the invention.

DETAILED DESCRIPTION OF THE FIGURE

For the figures accompanying this description, identical reference signs can be used to denote variants of the invention where these reference signs refer to elements of the same kind, whether structurally or functionally.

Figure 1:
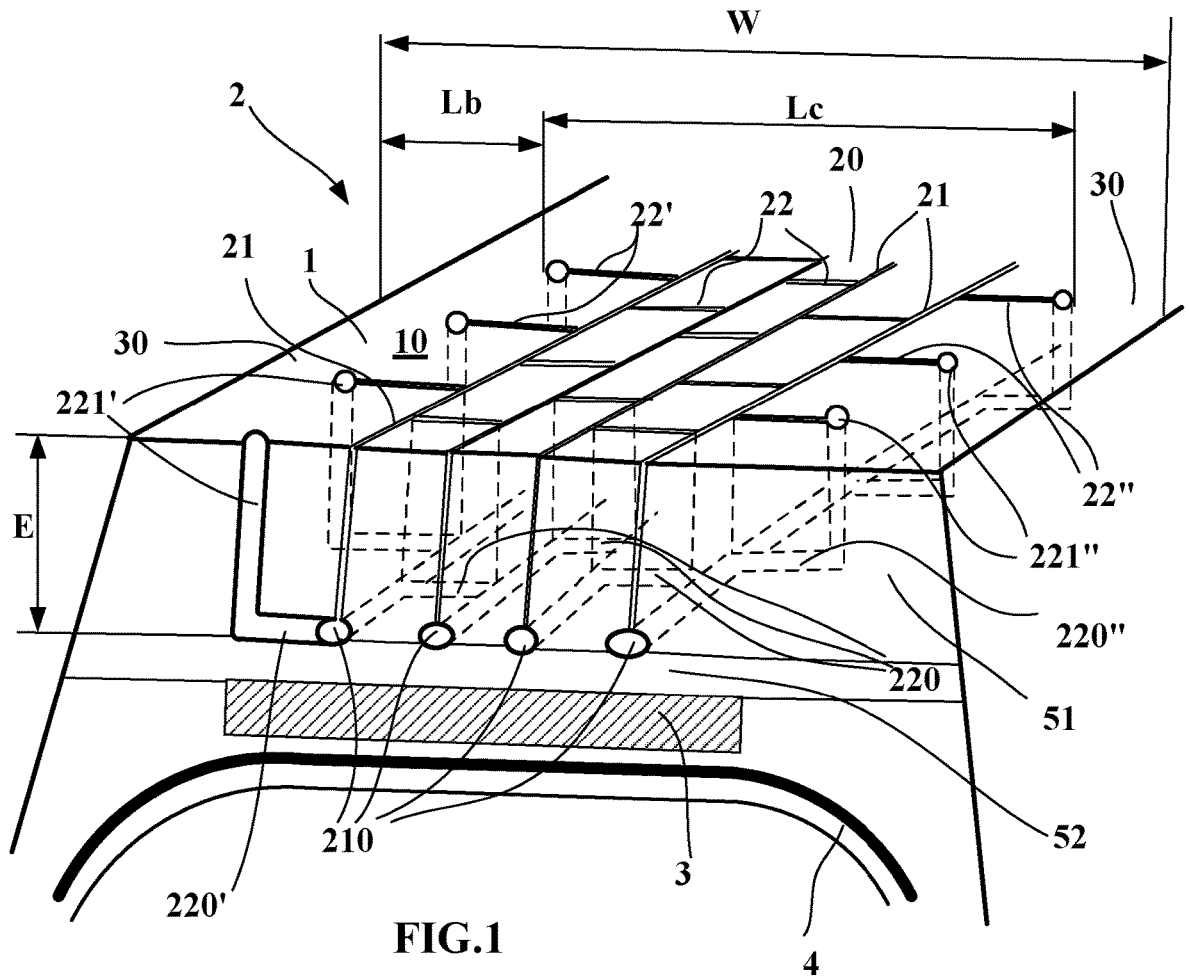
FIG. 1 shows a partial view of a variant of a tread according to the invention, this variant comprising four longitudinal sipes.

FIG. 1 shows a part of a tire 2 of size 385/65 R 22.5 that is intended to be fitted on a heavy-duty trailer, this tire comprising a carcass reinforcement 4 surmounted radially on the outside by a crown reinforcement 3. This tire 2 also comprises a tread 1 formed according to the invention. This tread 1 has a total width W that corresponds to the mean width of the contact patch of the tire with a road surface, this patch being obtained for use conditions of the tire at a speed of zero. In the case presented, this width W is equal to 310 mm.

The tread 1 is formed of a layer 51 made of a single material, this layer 51 having a total width E, equal to 14.3 mm, that corresponds to the thickness that can be worn away throughout the service life of a tire provided with the tread until a wear limit set in advance is reached. This tread 1 is disposed radially on the outside of an intermediate layer 52 (or undertread), this intermediate layer 52 being placed radially on the crown reinforcement 3 in order so to speak to protect this crown reinforcement. This intermediate layer is, as a general rule, chosen to have low hysteresis characteristics in order to limit losses and lower the temperature level in operation. This intermediate layer 52 is not a priori intended to be brought into contact with the road surface, and so the tire has to be removed from the vehicle before the wear reaches this intermediate layer.

The tread 1 comprises, radially on the outside, a tread surface 10 intended to come into contact with a road surface during running.

As can be seen in FIG. 1, this first tread variant is entirely without grooves that open onto the tread surface 10 in the new state.

Furthermore, the tread 1 comprises edge parts 30 that are entirely without voids (grooves, sipes), and axially between these edge parts 30 there is a central part 20 in which all the cuts are formed. The central part 20 is provided with four circumferential sipes 21 and a plurality of transverse sipes 22, 22', 22", the transverse sipes being formed in radial planes, that is to say in planes that pass through the axis of rotation of the tire. In the present variant, the transverse sipes and the circumferential sipes are all perpendicular to the tread surface 10.

Formed between the circumferential sipes 21 are a plurality of transverse sipes 22 that are disposed regularly in the circumferential direction at a spacing equal to 28 mm (i.e. 0.8% of the perimeter of the tire measured in the new state in its equatorial mid-plane). Formed axially on the outside of the outermost circumferential sipes 22 of the central part are a first set of transverse sipes 22' and a second set of transverse sipes 22", one on each side of the mid-plane XX', these transverse sipes 22', 22" being disposed in the circumferential direction at a spacing equal to 42 mm (i.e. 1.25% of the perimeter of the tire measured in the new state in its equatorial mid-plane).

Each sipe of these sets of lateral sipes 22', 22" comprises a first end close to the mid-plane and a second end situated axially on the outside with respect to the first end, the distance between the two ends of the lateral sipes 22', 22" axially delimiting the width Lc of the central part of the tread. Each lateral sipe 22', 22" opens at its first end into a circumferential sipe 21.

The circumferential sipes 22 and the transverse sipes 22, 22', 22" form an interconnected network that allows fluid to circulate. The circumferential sipes and the transverse sipes have, on the new tire, a mean width less than 1.0 mm.

The circumferential sipes 21 extend into the depth to a depth equal to 9.3 mm (i.e. 65% of the thickness E of material to be worn away) and are continued radially inwardly by a channel 210 of elliptical shape in cross section with dimensions equal to 7 mm and 5 mm along its major axis and its minor axis, respectively (the minor axis being oriented in the direction of the thickness of the tread). Similarly, the transverse sipes 22 connected to the circumferential sipes 21 are continued radially on the inside by a channel 220 with the same elliptical shape as seen in cross section and dimensions of 4 mm and 3.5 mm along its major axis and its minor axis, respectively (the minor axis being oriented in the direction of the thickness of the tread).

The transverse sipes 22', 22" are continued radially towards the inside by channels 220', 220" that are oriented transversely, said channels 220' and 220" having cross sections identical to those of the channels 220 that continue the axially innermost circumferential sipes 22. These channels 220', 220" open into the channels 210 that extend the innermost circumferential sipes 21.

These same transverse sipes 22', 22" are extended by end channels 221', 221", respectively, that extend in a radial direction following the sipe 22', 22" until they meet a channel 220', 220" formed radially at the bottom of the sipe 22', 22", respectively.

The end channels 221', 221" have a cross section of circular shape with a diameter equal to 4 mm and play an essential role in proper operation of the tread under the cornering conditions.

This FIG. 1 shows that the end channels 221', 221" formed on each side of the central part 20 are offset circumferentially so as not to pass into contact with the road surface at the same time.

The width Lc of the central part is measured as the distance between the end channels 221' situated on either side of the central part. This width is in this case equal to 266 mm, or a little more than 85% of the width W of the tread.

It is useful to note that the channels 221, 220, 220', 220" are intended to form new grooves following partial wearing of the tread; furthermore, on account of their dimensions and their location in the tread, these channels only very slightly affect the stiffnesses of this tread. Their role is mainly that of facilitating the flow of liquid in the network (grid) formed by the sipes and said channels.

The central part 20 is extended axially by edge parts 30 with a width Lb, in this case equal to 22 mm, entirely without cuts in this variant.

The volumetric void ratio of this variant for the central part is equal to around 8% and its surface void ratio is equal to 5%.

Thus, it is possible to realize a tread pattern for a tread of a heavy-duty tire for a vehicle of the trailer type that does not have any circumferential or transverse grooves in the new state but comprises channels that open onto the tread surface, in sufficient number to ensure that water present on the road surface is drained. This tread pattern, which is compact on account of its low volumetric void ratio (between 6% and 9%), is particularly advantageous since it maintains edge faces that are useful in order to benefit from suitable traction while maximizing the amount of material in contact with the road surface.

In another advantageous variant that is not shown here, the hidden channels that extend the circumferential and transverse sipes may be partially or entirely formed in the intermediate layer 52 situated between the tread 1 and the crown reinforcement 3.

Figure 2:
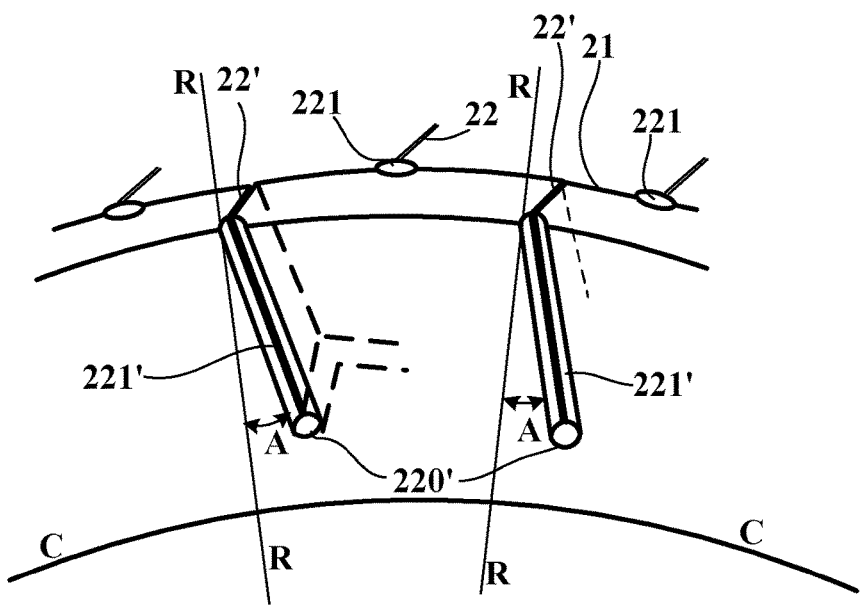
FIG. 2 shows a second variant of a tread according to the invention, in which the transverse sipes are all inclined at a non-zero mean angle with respect to a plane perpendicular to the tread surface.

FIG. 2 shows a part of a tread 1 according to another, second variant of the invention. In this second variant, the transverse sipes 22, 22' are all inclined at one and the same angle A with respect to a plane perpendicular to the tread surface (this plane has a line indicated by the line RR in this FIG. 2), this angle A being equal to 15 degrees in the case shown. The direction CC shown in this figure indicates the circumferential direction.

In this variant, the end channels 221' are recessed into the thickness of the tread and follow the path of the transverse sipes 22' and are thus inclined at an angle of 15 degrees with respect to a plane perpendicular to the tread surface. Moreover, additional channels 221 are moulded at the ends of the transverse sipes 22 formed between the circumferential sipes 21.

Figure 3:
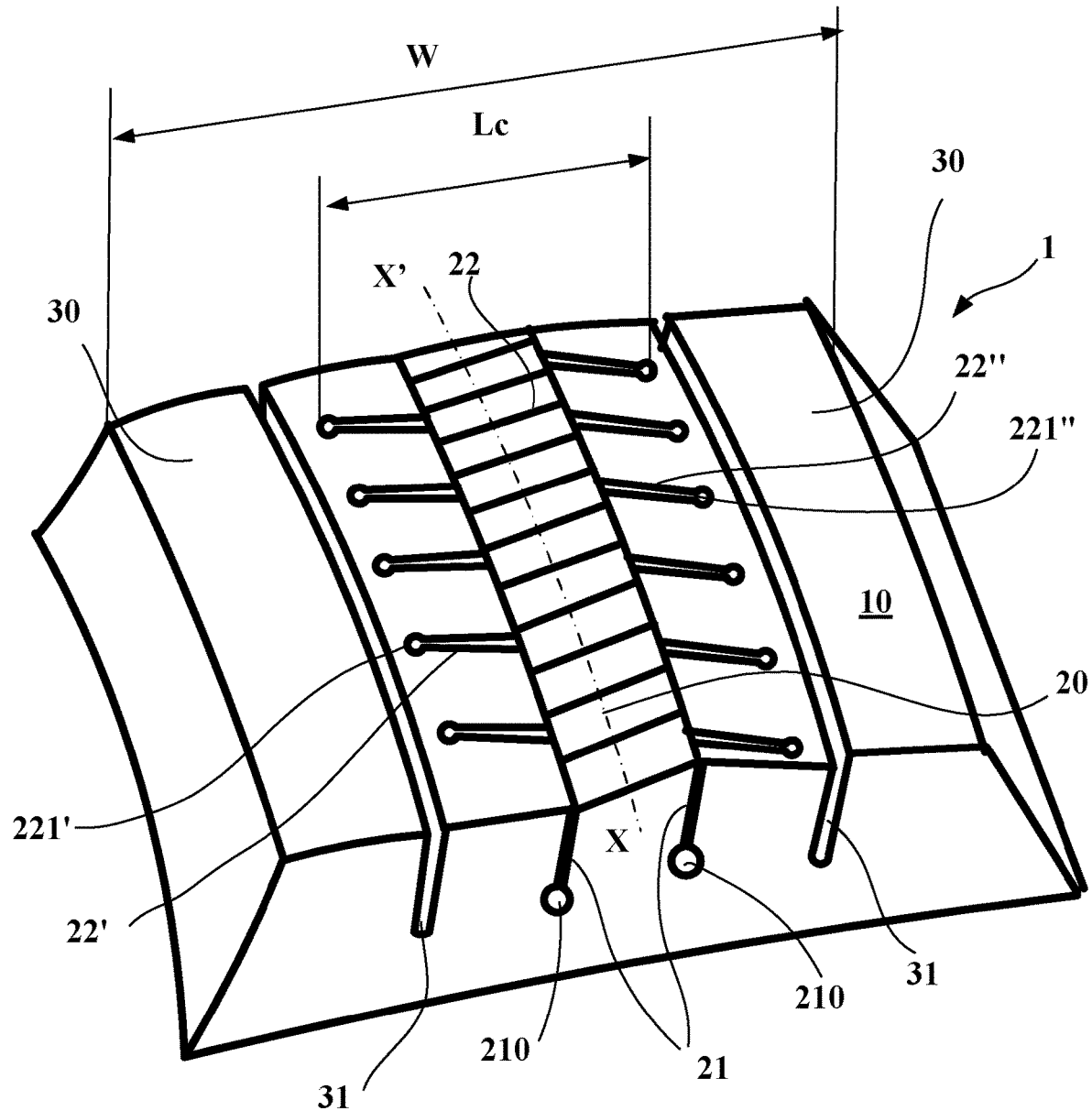
FIG. 3 shows a third variant of a tread according to the invention.

FIG. 3 shows a partial view of a third variant of a tread according to the invention. In this variant, the tread 1 has a total width W and comprises, radially on the outside, a tread surface 10 intended to come into contact with a road surface during running.

This tread comprises a central part, the width Lc of which is determined by the ends of the radial channels 221', 221" formed at the axial ends of axially outermost oblique sipes 22', 22". These oblique sipes 22', 22" open at their other end into two circumferential sipes 21. Formed between the two circumferential sipes 21 are a plurality of oblique sipes 22 that are inclined in the opposite direction to the inclination of the axially outermost oblique sipes 22', 22".

As presented with the first variant, the sipes, regardless of whether they are circumferential 21 or oblique 22, 22', 22", are extended radially towards the inside by hidden channels that are intended to form new grooves after a predetermined amount of partial wear.

The circumferential sipes 21 and the transverse sipes 22, 22', 22" are interconnected to form a network. The circumferential sipes and the transverse sipes have, on the new tire, mean widths that are appropriate to allow the walls delimiting them to come at least partially into contact when the tire is in the contact patch in contact with the road surface.

This FIG. 3 shows that the end channels 221', 221" are offset between the two edges of the central part 20 so as not to pass into contact at the same time.

Axially on the outside of the limits of the central part 20 are edge parts 30 entirely without cuts oriented transversely or obliquely. However, these edge parts 31 are each provided with a circumferential groove 31, the maximum depth of which corresponds to the bottom of hidden cavities formed in the central part of the tread.

The invention described with the aid of these variants is not intended to be limited to the variants, and various modifications can be made thereto without departing from the scope thereof. In particular, the sipes may have zigzag shapes, either into the depth or at the tread surface.

The invention claimed is:

1. Tread for a tire to equip a heavy-duty trailer, this tread having:
   a thickness E of material in a new state to be worn away that determines a wear limit, a tread surface for coming into contact with a road surface, this tread being divided into:
   a central part and
   edge parts on either side of the central part, the edge parts not having any transverse cuts,
   wherein the central part is provided with a tread pattern that does not have any circumferential grooves, this tread pattern comprising:
   a plurality of sipes, comprising:
   at least two circumferential sipes; and
   transverse sipes, including a first set of lateral sipes arranged between the two circumferential sipes and a second set of lateral sipes each extending axially from a respective one of the two circumferential sipes towards a tread edge, each of these first and second sets of lateral sipes comprising a first end close to the mid-plane of the tread and a second end axially outside the first end, the second ends of the second set of lateral sipes axially delimiting a border between the edge parts and the central part of the tread, each lateral sipe opening at its first end into a circumferential sipe instead of a channel that opens onto the tread surface and continues into the thickness of the tread,
   wherein the first set of lateral sipes and second set of lateral sipes are circumferentially offset from each other,
   all the sipes of the central part of the tread extending in the tread to a depth at least equal to 60% of the thickness E of material to be worn away and being extended into the tread by circumferentially extending and axially extending hidden channels of appropriate dimensions for supplementing a continuous fluidic flow network under the tread surface in the new state, these hidden channels being adapted to form grooves after a predetermined amount of partial wear, wherein the tread is entirely without grooves in its central part, this central part having a width at least equal to 40% and at most 90% of the total width W of the tread, and wherein the second set of lateral sipes formed in the central part of the tread open at their second end into an end channel that opens onto the tread surface of the tread and continues into the thickness of said tread until it meets a hidden channel at the sipe bottom, wherein the circumferential sipes, the lateral sipes and the hidden channels create a grid network forming the continuous fluidic flow network at a predetermined depth, wherein each end channel that opens onto the tread surface of the tread is arranged at the border between the edge parts and the central part, wherein each end channel, is at a respective axial outer end of the grid network and has only one of the second set of lateral sipes extending axially therefrom towards an axial center of the tread.

2. The tread according to claim 1, wherein the central part has a width Lc that is at least equal to 80% of the total width W of the tread.

3. The tread according to claim 1, wherein, the surface void ratio of the tread in the new state is at most equal to 7%.

4. The tread according to claim 1, wherein the end channels have a cross-sectional area of between the cross-sectional area of a disc with a diameter equal to 15% of a width Lb of each edge part and the cross-sectional area of a disc with a diameter equal to 25% of the width Lb of each edge part.

5. The tread according to claim 4, wherein the volumetric void ratio of the central part in the new state is chosen to be at least equal to 6% and at most equal to 9% and the surface void ratio is at least equal to 2% and at most equal to 6% in the new state.

6. The tread according to claim 1, wherein the transverse sipes are inclined in the depth with respect to a radial direction at one and the same angle at most equal to 25 degrees.

7. The tread according to claim 1, wherein the axially outermost transverse sipes of the central part of the tread are distributed around a wheel at a mean distance between two successive sipes of one and the same set at most equal to 2% of the perimeter of the tire measured on the equatorial mid-plane of said tire.

8. The tread according to claim 1, wherein the end channels on one side of the central part are circumferentially offset from the end channels on the other side of the central part so that the end channels come into contact with the road surface at different times.

9. A tire provided with a tread according to claim 1, wherein, this tire is adapted to be fitted to a load-bearing axle of a heavy-duty vehicle of the trailer type.

10. The tread according to claim 1, wherein the transverse sipes are inclined in the depth with respect to a radial direction at one and the same angle between 0 degrees and 10 degrees.

11. The tread according to claim 1, wherein the end channels are axially offset from circumferentially oriented grooves arranged in the edge parts.

12. The tread according to claim 1, wherein each axially outer lateral sipe is provided with an end channel.

13. The tread according to claim 1, wherein each end channel is arranged axially beyond each hidden channel and each of the first set of lateral sipes and the second set of lateral sipes.

14. A tread for a tire to equip a heavy-duty trailer, this tread having:

a thickness E of material in a new state to be worn away that determines a wear limit, a tread surface for coming into contact with a road surface, this tread being divided into:

a central part and edge parts on either side of the central part, the edge parts not having any transverse cuts, wherein the central part is provided with a tread pattern that does not have any circumferential grooves, this tread pattern comprising:

a plurality of sipes, comprising:

at least two circumferential sipes; and transverse sipes, including a first set of lateral sipes arranged between the two circumferential sipes and a second set of lateral sipes each extending axially from a respective one of the two circumferential sipes towards a tread edge, each of these first and second sets of lateral sipes comprising a first end close to the mid-plane of the tread and a second end axially outside the first end, the second ends of the second set of lateral sipes axially delimiting a border between the edge parts and the central part of the tread, each lateral sipe opening at its first end into a circumferential sipe, all the sipes of the central part of the tread extending in the tread to a depth at least equal to 60% of the thickness E of material to be worn away and being extended into the tread by circumferentially extending and axially extending hidden channels of appropriate dimensions for supplementing a continuous fluidic flow network under the tread surface in the new state, these hidden channels being adapted to form grooves after a predetermined amount of partial wear, wherein the tread is entirely without grooves in its central part, this central part having a width at least equal to 40% and at most 90% of the total width W of the tread, and wherein the second set of lateral sipes formed in the central part of the tread open at their second end into an end channel that opens onto the tread surface of the tread and continues into the thickness of said tread until it meets a hidden channel at the sipe bottom, and thus creates the continuous fluidic flow network between all the channels, regardless of whether they are lateral or hidden, wherein each end channel that opens onto the tread surface of the tread is arranged at the border between the edge parts and the central part, wherein the edge parts do not have any circumferentially oriented grooves or sipes.

* * * * *